United States Patent
Karplus et al.

(10) Patent No.: US 11,841,463 B2
(45) Date of Patent: *Dec. 12, 2023

(54) OPTIMIZED HIGH SPEED LIDAR MIRROR DESIGN

(71) Applicant: WAYMO LLC, Mountain View, CA (US)

(72) Inventors: Paul Karplus, Redwood City, CA (US); Blaise Gassend, East Palo Alto, CA (US); David Duff, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,118

(22) Filed: Sep. 9, 2022

(65) Prior Publication Data

US 2023/0003847 A1 Jan. 5, 2023

Related U.S. Application Data

(63) Continuation of application No. 16/660,980, filed on Oct. 23, 2019, now Pat. No. 11,474,211.

(Continued)

(51) Int. Cl.
*G02F 1/295* (2006.01)
*G01S 7/481* (2006.01)
*G02B 26/12* (2006.01)

(52) U.S. Cl.
CPC ............ *G01S 7/4817* (2013.01); *G02B 26/12* (2013.01)

(58) Field of Classification Search
CPC ................ G02B 26/121; G02B 26/127; G02B 26/0816; G03G 15/0409; G03G 15/041; G01S 7/4817; G02F 1/295
See application file for complete search history.

(56) References Cited

U.S. PATENT DOCUMENTS

| 4,141,620 A | 2/1979 | Goshima et al. |
| 5,046,851 A | 9/1991 | Morgan |

(Continued)

OTHER PUBLICATIONS

Alismail, Hatem , et al., "Automatic Calibration of a Range Sensor and Camera System", National Robotics Engineering Center, Robotics Institute, Carnegie Mellon University, Pittsburgh, PA, 2012, Second Joint 3DIM/3DPVT Conference, pp. 286-292.

(Continued)

*Primary Examiner* — Hoang X Ngo
(74) *Attorney, Agent, or Firm* — Botus Churchill IP Law LLP

(57) ABSTRACT

Aspects of the technology employ sensors having high speed rotating mirror assemblies. For instance, the sensors may be Lidar sensors configured to detect people and other objects in an area of interest. A given mirror assembly may have a triangular or other geometric cross-sectional shape. The reflective faces of the mirror assembly may connect along edges or corners. In order to minimize wind drag and torque issues, the corners are rounded, filleted, beveled, chamfered or otherwise truncated. Such truncation may extend the length of the mirror side. The mirror assembly may employ one or more beam stops, light baffles and/or acoustic/aerodynamic baffles. These sensors may be employed with self-driving or manual driven vehicles or other equipment. The sensors may also be used in and around buildings.

21 Claims, 14 Drawing Sheets

Related U.S. Application Data

(60) Provisional application No. 62/754,039, filed on Nov. 1, 2018.

(56) References Cited

U.S. PATENT DOCUMENTS

| | | |
|---|---|---|
| 7,969,558 B2 | 6/2011 | Hall |
| 8,836,922 B1 | 9/2014 | Pennecot et al. |
| 9,618,742 B1 | 4/2017 | Droz et al. |
| 9,880,263 B2 | 1/2018 | Droz et al. |
| 2003/0214572 A1 | 11/2003 | Kanno |
| 2022/0113406 A1 | 4/2022 | Cho et al. |

OTHER PUBLICATIONS

Carmer, Dwayne C., et al., Laser Radar in Robotics, Proceedings of the IEEE, vol. 84, No. 2, Feb. 1996; pp. 299-320.

Helser, George, Precision Laser Scanning, MEMS mirrors vs polygon scanners for LIDAR in autonomous vehicles, 5 pages., Dec. 31, 2017.

Melngailis, Ivars, et al., Laser Radar Component Technology, Proceedings of the IEEE, vol. 84, No. 2, Feb. 1996, pp. 227-267.

Uto, Kuniaki, et al., Development of a Low-Cost, Lightweight Hyperspectral Imaging System Based on a Polygon Mirror and Compact Spectrometers, IEEE Journal of Selected Topics in Applied Earth and Remote Sensing, vol. 9, No. 2, Feb. 2016, pp. 861-875.

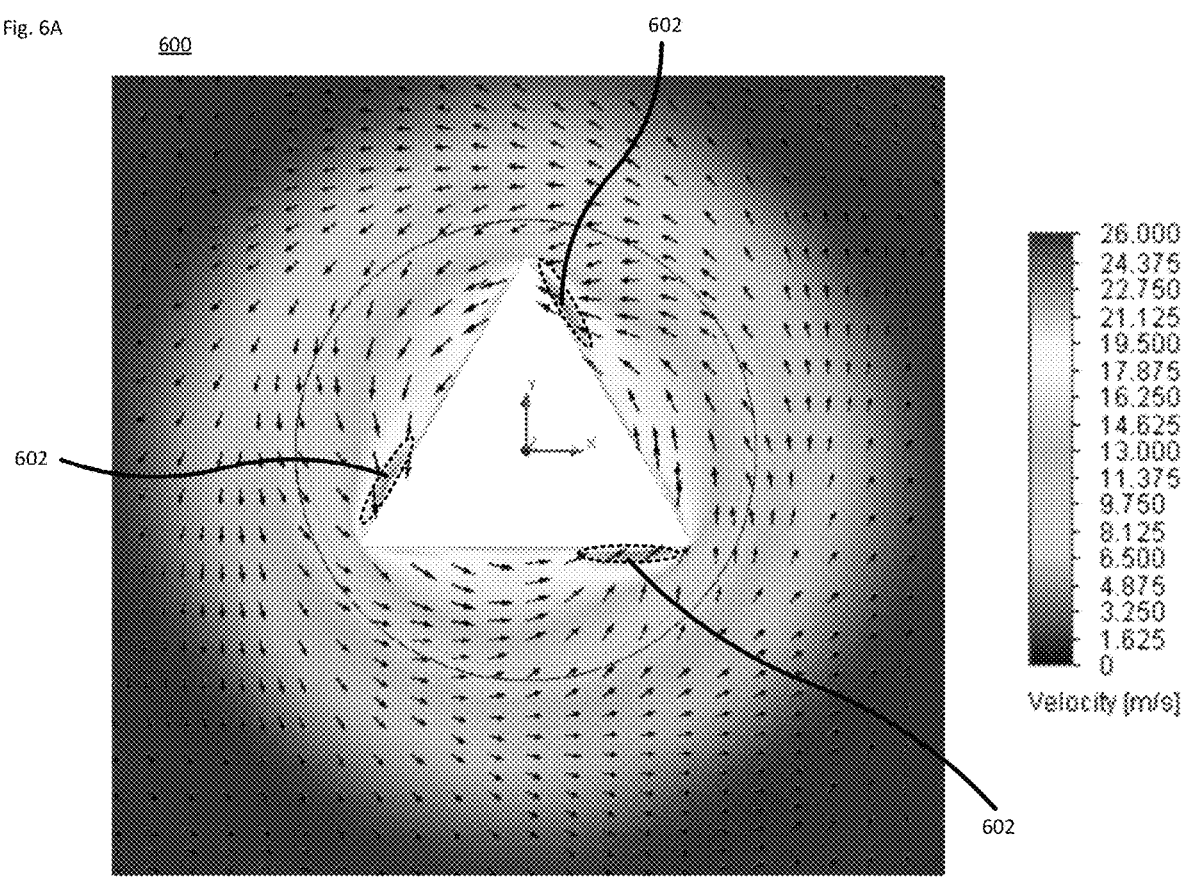

700

Fig. 8A
800
Fig. 8B
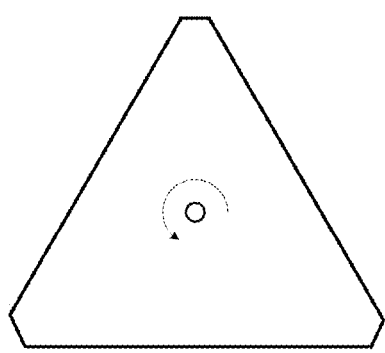
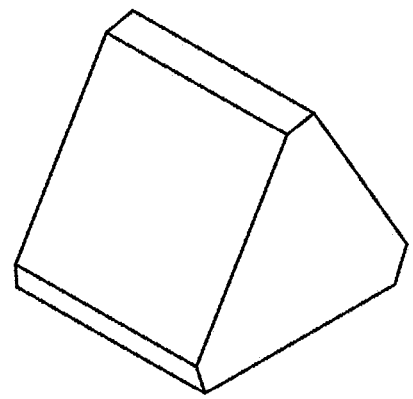

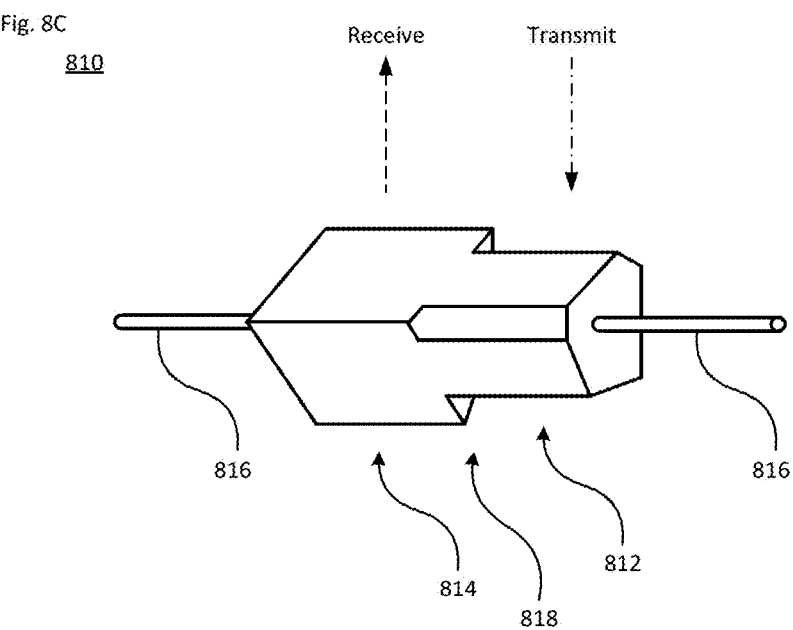

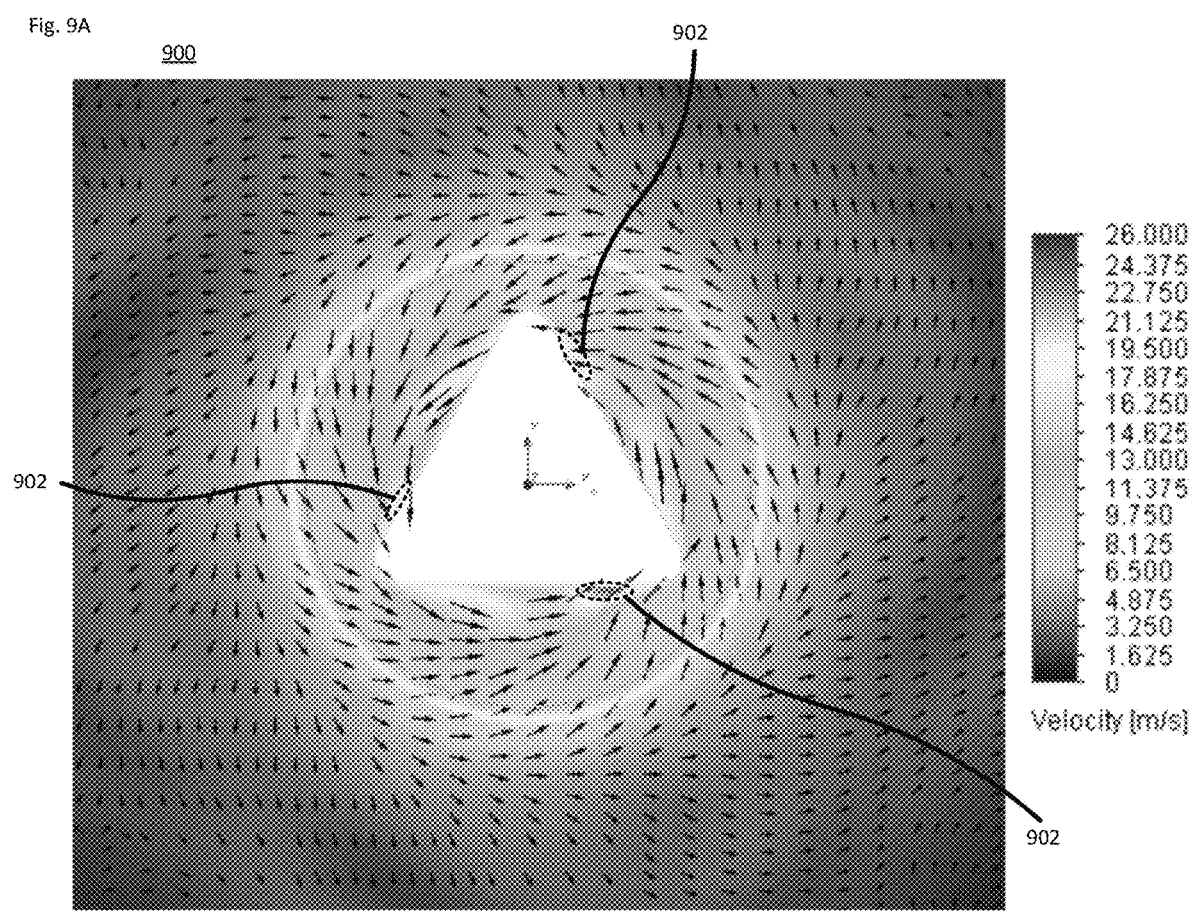

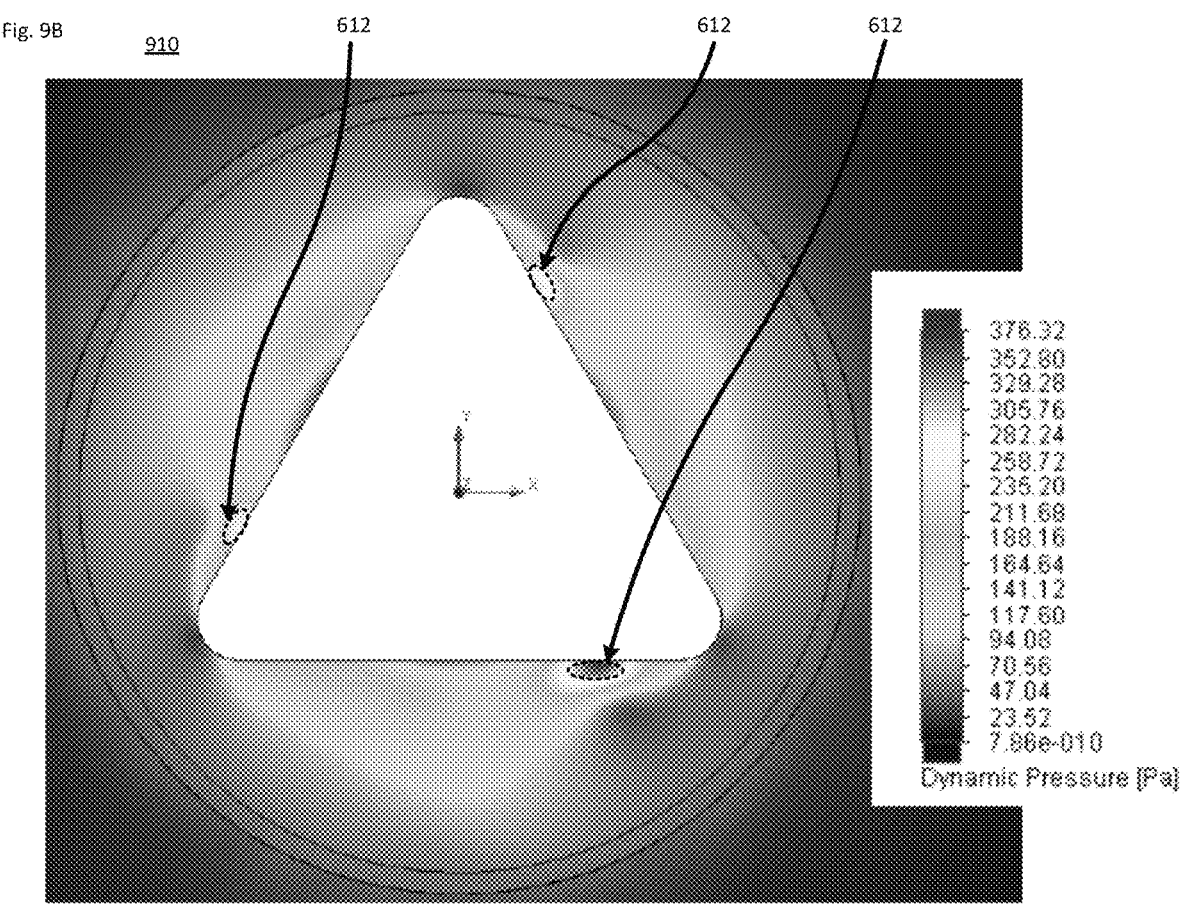

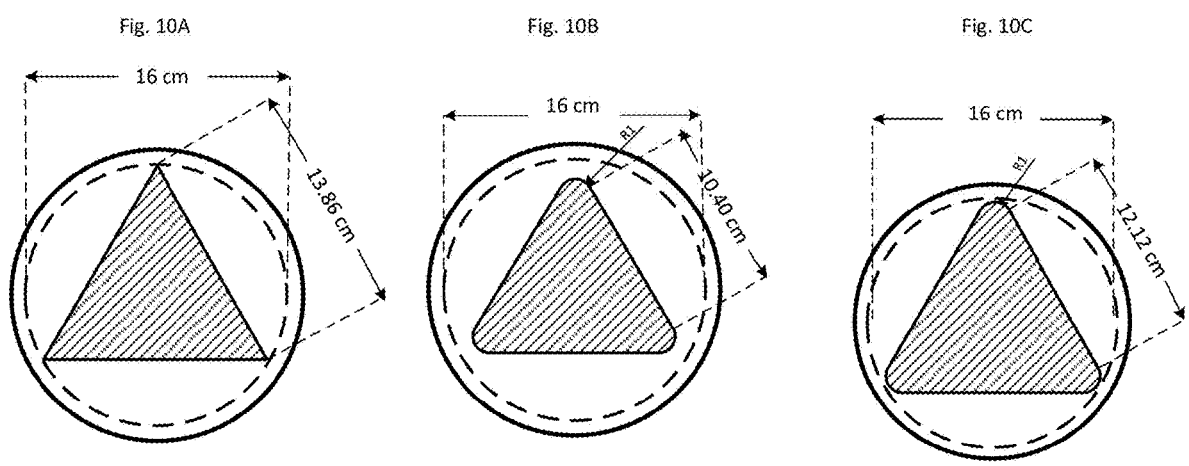

1100

OPTIMIZED HIGH SPEED LIDAR MIRROR DESIGN

CROSS-REFERENCE TO RELATED APPLICATIONS

This application is a continuation of U.S. patent application Ser. No. 16/660,980, filed Oct. 23, 2019, which claims the benefit of the filing date of U.S. Provisional Patent Application No. 62/754,039, filed Nov. 1, 2018, the entire disclosures of which are incorporated herein by reference.

BACKGROUND

Different types of manually driven and autonomous vehicles employ sensors in order to observe the surrounding environment. Depending on the type of sensor, it may either be fixed to view a specific region external to the vehicle, or the sensor may be adjustable, e.g., rotatable to provide a partially panoramic or a full 360° view. However, rotating the sensor or a component of the sensor assembly at high speeds can create drag and other affects that may impact sensor performance or longevity.

BRIEF SUMMARY

The technology relates to rotating sensor units, such as Lidar and other sensors, which may be employed with vehicles configured to drive in autonomous and/or manual driving modes, fixed location sensors, and other equipment. A mirror assembly of the sensor unit is configured to rotate at high speed around a central axis. For instance, the speed may exceed hundreds or thousands of revolutions per minute (RPM). Alternatively, the mirror assembly may rotate with tip velocities exceeding 10-30 meters/second.

In order to minimize drag and other issues created by such high rotation speeds, aspects of the technology employ mirror assemblies with rounded, filleted, beveled, chamfered or otherwise truncated corners. For instance, a rotary sensor apparatus may comprise a mirror assembly having multiple reflective surfaces arranged in a geometric shape. The geometric shape includes an axis perpendicular to the reflective surfaces. The mirror assembly is configured to rotate in a clockwise or counterclockwise direction about the axis. A laser light source is configured to emit light so that the emitted light is reflected off of one or more of the reflective surfaces and is directed to one or more locations in an environment external to the rotary sensor apparatus. A control system is operatively coupled to the mirror assembly and the laser light source. The control system is configured to set a rate of rotation of the mirror assembly about the axis and to control emission of the light from the laser light source, so that the rotating sensor apparatus can detect objects in the external environment. Detection of such objects can be used, e.g., by a vehicle operating in an autonomous mode to drive around or otherwise avoid the detected objects based on the received sensor data. The reflective surfaces of the mirror assembly are coupled to one another along a set of edges. Normally, the edges would be subject to issues arising from rotating the mirror assembly at a high rate of rotation. However, the set of edges may rounded with a selected radius of curvature of at least 0.1 mm, or may be otherwise truncated, which reduces localized maximums of airflow behind the edges and correspondingly the dynamic pressure adjacent to the edges. Torque is also beneficially reduced, thereby improving sensor assembly performance.

In one example, each truncated edge is rounded with a selected radius of curvature of at least 0.1 mm. For instance, the radius of curvature may be between 0.1 mm and 1.0 mm. Alternatively, the radius of curvature may be no more than 2.0 mm.

In another example, the mirror assembly comprises three reflective surfaces and the geometric shape is triangular. In this case, the geometric shape may be an equilateral triangle.

In a further example, the rotary sensor apparatus further includes a spindle extending along the axis and one or more actuators coupled to the spindle. Here, the control system is configured to activate the one or more actuators to cause the spindle to rotate the mirror assembly about the axis.

In yet another example, the rotary sensor apparatus further includes at least one light baffle affixed to an end of the mirror assembly. The at least one light baffle provides optical isolation between transmit and receive areas of the rotary sensor apparatus. For instance, the at least one baffle may extend at least 10% past the edges of the mirror assembly. The at least one light baffle may comprise a pair of light baffles. Here, a first one of the light baffles is arranged along a first end of the mirror assembly and a second one of the light baffles is arranged along a second end of the mirror assembly. The at least one light baffle may be circular.

In another example, the rotary sensor apparatus further includes at least one acoustic baffle affixed to an end of the mirror assembly. In this case, the at least one acoustic baffle may comprise a pair of acoustic baffles. A first one of the acoustic baffles is arranged along a first end of the mirror assembly and a second one of the acoustic baffles is arranged along a second end of the mirror assembly.

In yet a further example, the rotary sensor apparatus further includes at least one aerodynamic baffle affixed to an end of the mirror assembly. The at least one aerodynamic baffle is configured to reduce aerodynamic drag as the mirror assembly rotates. In this case, the at least one aerodynamic baffle may comprise a pair of aerodynamic baffles, in which a first one of the aerodynamic baffles is arranged along a first end of the mirror assembly and a second one of the aerodynamic baffles is arranged along a second end of the mirror assembly.

The rotary sensor apparatus may also further include a receiver operatively coupled to the control system. The receiver is configured to receive reflected light from the external environment, where the reflected light is evaluated in order to detect objects in the external environment.

According to another aspect of the technology, a vehicle comprises a driving system and a perception system operatively coupled to the driving system. The driving system is configured to perform acceleration, deceleration and steering operations for the vehicle. And the perception system comprises one or more rotary sensor apparatuses as described above.

In one example, the one or more rotary sensor apparatuses are arranged along one or more of a front end of the vehicle, a rear end of the vehicle, a left side of the vehicle, a right side of the vehicle, and a roof of the vehicle.

In another example, the vehicle further includes one or more computing devices operatively coupled to the driving system and the perception system. For instance, the one or more computing devices may comprise an autonomous driving computing system configured to operate the vehicle in an autonomous driving mode in response to sensor data received from the perception system.

BRIEF DESCRIPTION OF THE DRAWINGS

FIGS. 6A-B illustrate examples of velocity drag and dynamic pressure in a high-speed rotating mirror assembly.

FIGS. 8A-C illustrate truncated mirror assemblies in accordance with aspects of the disclosure.

FIGS. 9A-B illustrate examples of velocity drag and dynamic pressure in a high-speed rotating mirror assembly in accordance with aspects of the disclosure.

FIGS. 10A-C illustrate several mirror assembly examples in view of aspects of the disclosure.

DETAILED DESCRIPTION

Overview

In order to detect objects in a given environment, a sensor assembly may employ a sensor assembly with a reflective mirror component. The reflective mirror component may have multiple surfaces capable of reflecting light or other electromagnetic signals, and which is configured to rotate about an axis at a high rate of speed, e.g., tens, hundreds, thousands or tens of thousands of rpm. The sensor assembly may be positioned on a vehicle, such as a vehicle configured to operate in a self-driving mode without control by a person in the vehicle. Alternatively, the sensor assembly may be used with other, non-vehicle equipment. The sensor assembly may also be positioned within, at an entrance of or otherwise near a building in order to detect people and other objects in the environment. Various configurations are provided below, but are not intended to limit the scope of the technology.

Example Systems

Figure 1:
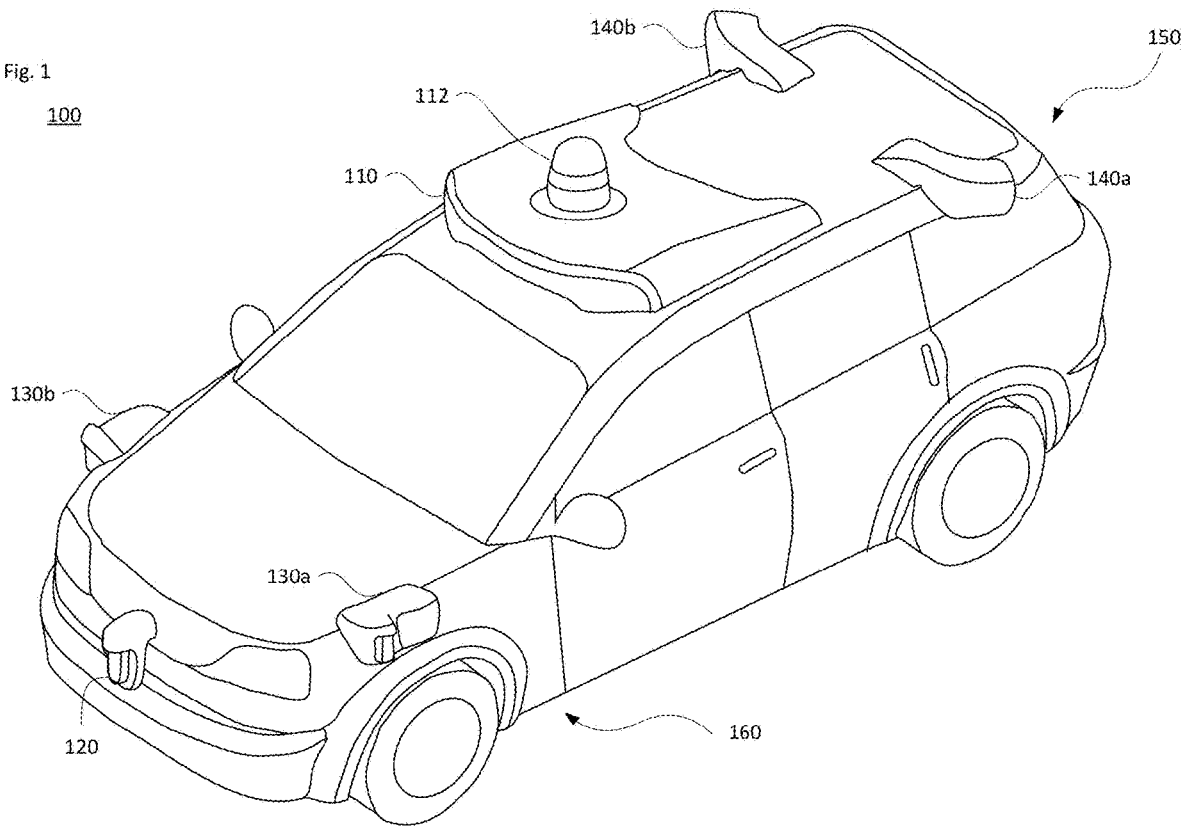
FIG. 1 illustrates an example vehicle that can operate in accordance with aspects of the disclosure.

FIG. 1 is a perspective view of an exemplary vehicle 100. As shown, the vehicle 100 includes various sensors for obtaining information about the vehicle's external environment. For instance, a roof-top housing 110 and dome arrangement 112 may include a Lidar sensor as well as various cameras and/or radar units. Housing 120, located at the front end of vehicle 100, and housings 130a, 130b on the driver's and passenger's sides of the vehicle may each store a Lidar or other sensor. For example, housing 130a may be located in front of the driver's side door. Vehicle 100 also includes housings 140a, 140b for radar units, Lidar and/or cameras also located towards the rear roof portion of the vehicle. Additional Lidar, radar units and/or cameras (not shown) may be located at other places along the vehicle 100. For instance, arrow 150 indicates that a sensor unit may be positioned along the read of the vehicle 100, such as on or adjacent to the bumper. And arrow 160 indicates that another sensor unit may be positioned on the undercarriage of the vehicle.

Figure 2:
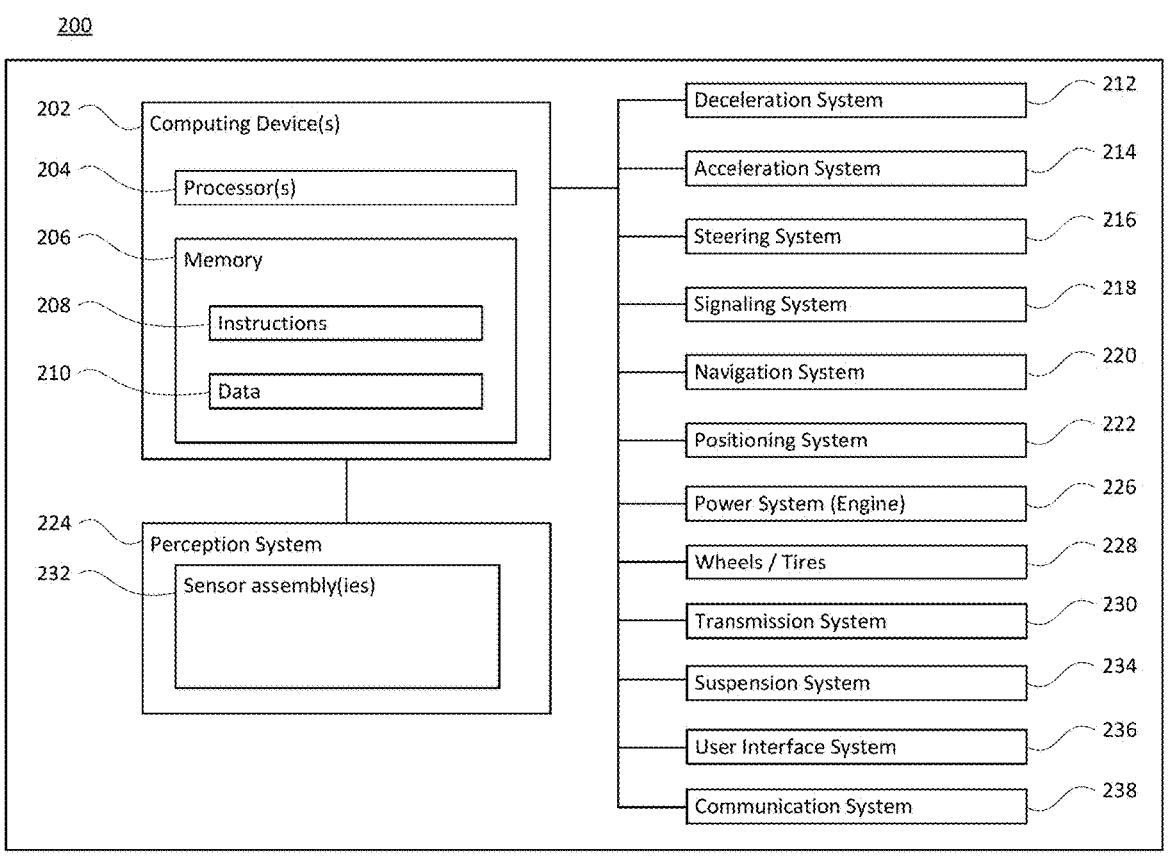
FIG. 2 is a functional diagram of the example vehicle of FIG. 1 in accordance with aspects of the disclosure.

While certain aspects of the disclosure may be particularly useful in connection with specific types of vehicles, the vehicle may be any type of vehicle including, but not limited to, cars, trucks, motorcycles, buses, recreational vehicles, etc. FIG. 2 illustrates a block diagram 200 showing various systems and components of an example vehicle. For instance, the vehicle may have one or more computing devices, such as computing devices 202 containing one or more processors 204, memory 206 and other components typically present in general purpose computing devices.

The memory 206 stores information accessible by the one or more processors 204, including instructions 208 and data 210 that may be executed or otherwise used by the processor(s) 204. The memory 206 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 210 may be retrieved, stored or modified by a given processor 204 in accordance with the instructions 208. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 204 may be any conventional processors, such as commercially available CPUs. Alternatively, the one or more processors may be a dedicated device such as an ASIC or other hardware-based processor. Although FIG. 2 functionally illustrates the processor(s), memory, and other elements of computing device(s) 202 as being within the same block, it will be understood that the processor, computing device, or memory may actually include multiple processors, computing devices, or memories that may or may not be stored within the same physical housing. For example, memory may be a hard drive or other storage media located in a housing different from that of computing devices 202. Accordingly, references to a processor or computing device will be understood to include references to a collection of processors or computing devices or memories that may or may not operate in parallel, or which may have a distributed architecture.

In one example, computing devices 202 may be control computing devices of an autonomous driving computing system or otherwise be incorporated into vehicle 100. The autonomous driving computing system may be capable of communicating with various components of the vehicle in order to control the movement of vehicle 100 according to primary vehicle control code of memory 206. For example, computing devices 202 may be in communication with various systems of vehicle 100, such as a driving system including a deceleration system 212, acceleration system 214, and steering system 216, as well as a signaling system 218, navigation system 220, positioning system 222, perception system 224, power system 226 (e.g., the vehicle's engine or motor), transmission system 230 and suspension system 234 in order to control the movement, speed, etc. of vehicle 100 in accordance with the instructions 208 of memory 206. The wheels/tires 228 may be controlled directly by the computing devices 202 or indirectly via these other systems. Again, although these systems are shown as external to computing devices 202, in actuality, these systems may also be incorporated into computing devices 202, again as an autonomous driving computing system for controlling vehicle 100.

As an example, computing devices 202 may interact with one or more actuators of the deceleration system 212 and/or acceleration system 214, such as brakes, accelerator pedal, and/or the engine or motor 226 of the vehicle, in order to control the speed of the vehicle. Similarly, one or more actuators of the steering system 216, such as a steering wheel, steering shaft, and/or pinion and rack in a rack and pinion system, may be used by computing devices 202 in order to control the direction of vehicle 100. For example, if vehicle 100 is configured for use on a road, such as a car or truck, the steering system may include one or more actuators to control the angle of wheels to turn the vehicle. Signaling system 218 may be used by computing devices 202 in order to signal the vehicle's intent to other drivers or vehicles, for example, by lighting turn signals or brake lights when needed.

Navigation system 220 may be used by computing devices 202 in order to determine and follow a route to a location. In this regard, the navigation system 220 and/or data 210 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 222 may be used by computing devices 202 in order to determine the vehicle's relative or absolute position on a map or on the earth. For example, the position system 222 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 222 may also include other devices in communication with computing devices 202, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 202, other computing devices and combinations of the foregoing.

The perception system 224 also includes one or more components for detecting objects external to the vehicle such as other vehicles, obstacles in the roadway, traffic signals, signs, trees, etc. For example, the perception system 224 may include one or more sensor assemblies 232 such as lasers (Lidar), sonar, radar, cameras and/or any other detection devices that record data which may be processed by computing devices 202. In the case where the vehicle is a passenger vehicle such as a minivan, the minivan may include Lidar or other sensor devices mounted on the roof or other convenient location.

The computing devices 202 may control the direction and speed of the vehicle according to various operation modes which include autonomous driving by controlling various components. By way of example, computing devices 202 may navigate the vehicle to a destination location completely autonomously using data from the detailed map information and navigation system 220. Computing devices 202 may use the positioning system 222 to determine the vehicle's location and perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or rear wheels of vehicle 100 by steering system 216), and signal such changes (e.g., by lighting turn signals of signaling system 218). Thus, the acceleration system 214 and deceleration system 212 may be a part of a drivetrain that includes various components between an engine of the vehicle and the wheels 228 of the vehicle, such as transmission system 230. Again, by controlling these systems, computing devices 202 may also control the drivetrain of the vehicle in order to maneuver the vehicle autonomously.

Suspension system 234 may be configured to provide various vehicle chassis adjustments. The adjustments can, for example, change the length of the shock absorber at every wheel, only some wheels, or even just one wheel.

Computing devices 202 may include all of the components normally used in connection with a computing device such as the processor and memory described above as well as a user interface 236 (e.g., a mouse, keyboard, touch screen and/or microphone) and various electronic displays (e.g., a monitor having a screen or any other electrical device that is operable to display information). In this regard, an internal electronic display may be located within a cabin of vehicle 100 (not shown) and may be used by computing devices 202 to provide information to passengers within the vehicle 100.

Also shown in FIG. 2 is a communication system 238. The communication system 238 may also include one or more wireless network connections to facilitate communication with other computing devices, such as passenger computing devices within the vehicle, and computing devices external to the vehicle, such as in another nearby vehicle on the roadway, or a remote server system. The network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. The perception system 224, computing devices 202 and other systems may be directly or indirectly connected with one or more wired connection, e.g., via a Controller Area Network (CAN bus) of the vehicle.

Example Device Configurations

In conjunction with the operations described above and illustrated in the figures, various device configurations will now be described.

Figure 3:
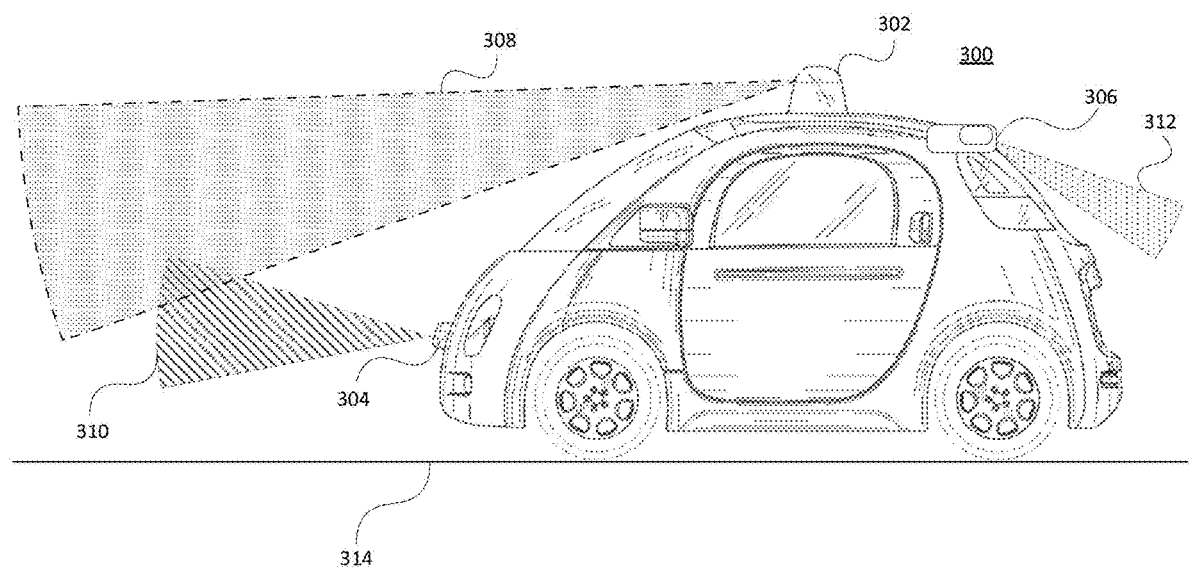
FIG. 3 illustrates examples of sensor fields of view.

FIG. 3 illustrates a scenario in which a vehicle 300 has various sensors 302, 304 and 306 positioned at various locations around the vehicle. As seen in the figure, during operation the sensors have respective exemplary fields of view 308, 310 and 312 in order to detect objects in the environment around the vehicle. As shown, the vehicle is positioned on a substantially flat roadway or otherwise planar surface 314. Each sensor's FOV may be dependent on the type of sensor (e.g., Lidar, radar, camera, sonar), its location around the vehicle (e.g., rooftop, front bumper, rear bumper, side quarter panel, undercarriage, etc.), the sensor's orientation, environmental conditions (e.g., clear and sunny, overcast, foggy, rainy, snowy, evening versus morning, etc.) and other factors.

For instance, sensor 302 may be a Lidar sensor, wherein FOV 308 is a 360° view around the vehicle 300. Front sensor 304 and rear sensor 306 may also be Lidar sensors, and each provide the respective FOVs 310 and 312, which may be, e.g., between 30°-90° or more. In order to achieve these FOVs, the Lidar sensor may employ a rotating mirror.

Figure 4:
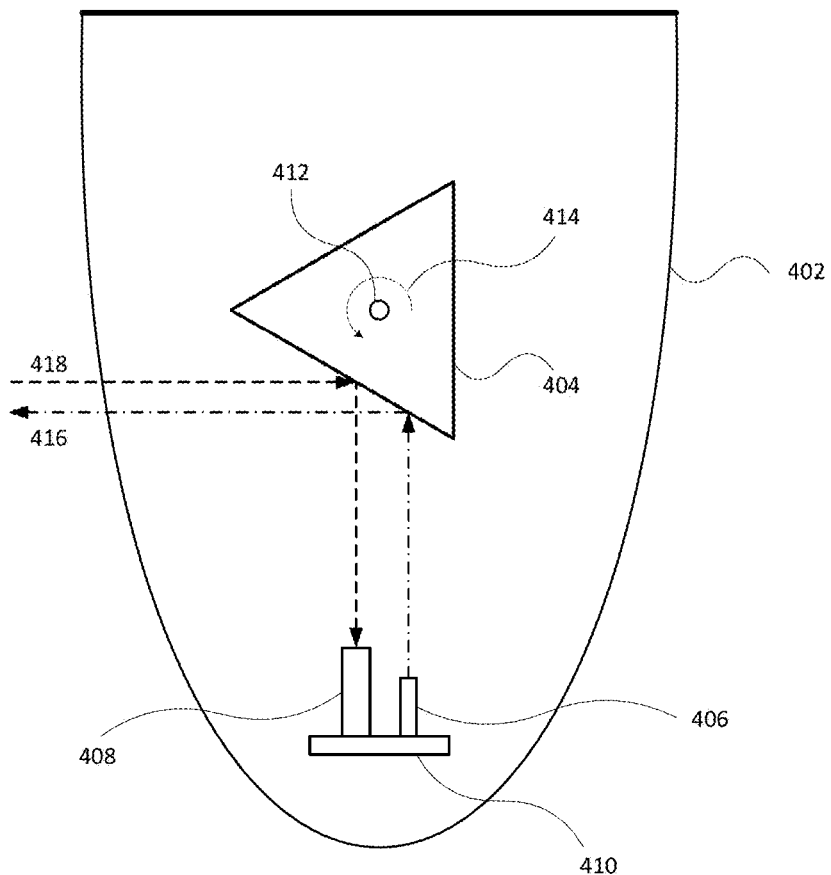
FIG. 4 illustrates an exemplary sensor unit in accordance with aspects of the disclosure.

One example of this is shown by Lidar sensor assembly 400 in FIG. 4. As illustrated, the assembly 400 includes a housing 402 that includes a rotatable mirror unit 404, a light emission element (e.g., a light emitting diode) 406, and a light detector (e.g., a photodiode receiver) 408. The light emission element 406 and the light detector 408 may be co-located and mounted on a platform 410. While shown as offset for clarity, the light emission element 406 and the light detector 408 may both be centered at a predetermined spot of the mirror unit 404. For instance, they may be centered at a spot perpendicular to an axis 412 of the mirror unit 404.

The mirror unit 404 is configured to rotate as shown by arrow 414, in either a counterclockwise or a clockwise direction about the axis 412. As noted above, the rate of rotation may be high, for instance on the order of 1,000 rpm to 100,000 rpm. In one example, the mirror unit 400 may rotate at a rate between 5,000-7000 rpm. In another example, the mirror unit 400 may rotate at a rate between 20,000-50,000 rpm, or more or less.

As the mirror assembly 404 rotates, light 416 emitted from the light emission element 406 is reflected off of one or more mirror surfaces and into the external environment. Light 418 may be returned off of one or more objects in the external environment, reflect off of one or more mirror surfaces and be detected by the light detector 408. Thus, the mirror assembly 404 is configured to steer light emitted from the optics subsystem towards the viewing direction of the Lidar, and can steer reflected light from the environment towards the optics subsystem. In the configuration illustrated in FIG. 4, the mirror assembly 404 has 3 mirror surfaces with an equilateral triangular cross-sectional (or top-down) configuration. However, the mirror assembly 404 may have a different geometric shape and have 4, 5 or more mirror surfaces.

Figure 5:
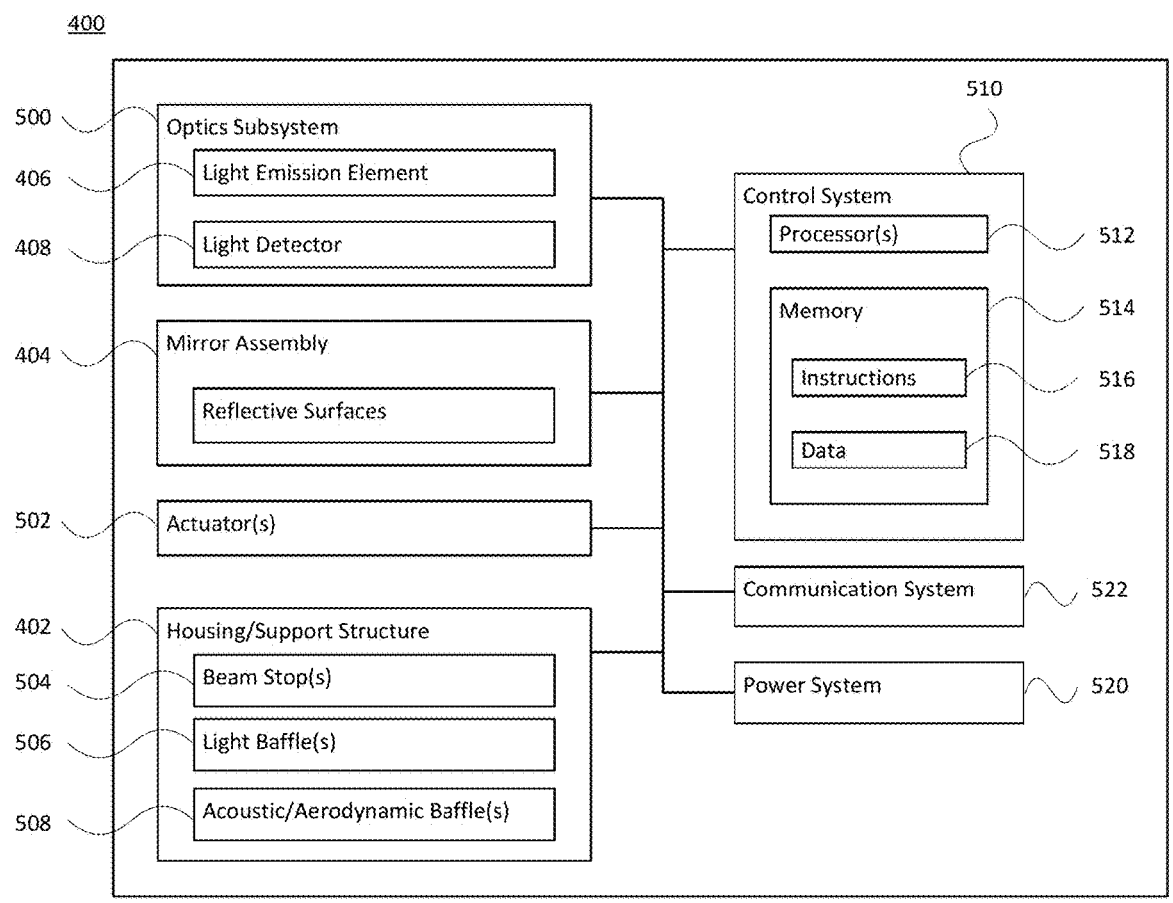
FIG. 5 illustrates a system diagram of the exemplary sensor unit of FIG. 4 in accordance with aspects of the disclosure.

FIG. 5 is a block diagram of the sensor assembly 400. As shown, the light emission element 406 and the light detector 408 are parts of an optics subsystem 500. One or more actuators 502, such as a motor or gear assembly, are configured to rotate the reflective surfaces of the mirror assembly about a central axis. The housing 402, which may comprise a support structure, may include one or more of the following: at least one beam stop 504 to prevent light from being emitted along certain portions of the housing, at least one light baffle 506 to optically separate the transmit and receive sections of the optics subsystem 500, and/or one or more acoustic/aerodynamic baffles 508. The baffle(s) 508 is configured to reduce acoustic noise and to decrease the aerodynamic drag (and therefore torque) acting on the mirror assembly 404.

At least the optics subsystem 500 and the one or more actuators 502 are operatively coupled to a control system 510. The control system 510 includes one or more processors 512 and memory 514 configured to store instructions 516 and data 518. The processor(s) 512 and memory 514 may be equivalent to the processors and memory described above with regard to FIG. 2. In one example, the control system 510 may be part of the computing device(s) 202. In another example, the control system 510 may be part of the perception system 224. In a further example, the control system 510 is configured separately from the computing device(s) 202 and the perception system 224. In this case, the control system 510 may be integrated into the housing 402, such that the sensor assembly 400 is a self-contained unit. The sensor assembly 400 is configured to receive power from an external source via power system 520. It is also configured to communicate with other components or devices, e.g., the computing device(s) 202 and the perception system 224 or an external system, via communication system 522. The communication system 522 may be configured in a manner similar to communication system 238, for instance capable of communicating via a wired and/or wireless connection.

As the mirror assembly rotates, there is a resultant air velocity which impacts different portions of the assembly differently. In a triangular assembly, the sharp edges of the triangular configuration can experience a high air velocity and corresponding high dynamic pressure. FIG. 6A illustrates a velocity example 600, in which the mirror assembly is rotating in a counterclockwise direction. The small arrows indicate example directions of airflow, and the image is shaded to indicate localized wind velocities. As shown, dotted regions 602 experience the highest localized wind velocities, e.g., in excess of 20 m/s, along the trailing parts of the mirror surfaces adjacent to the edges.

Figure 6B:
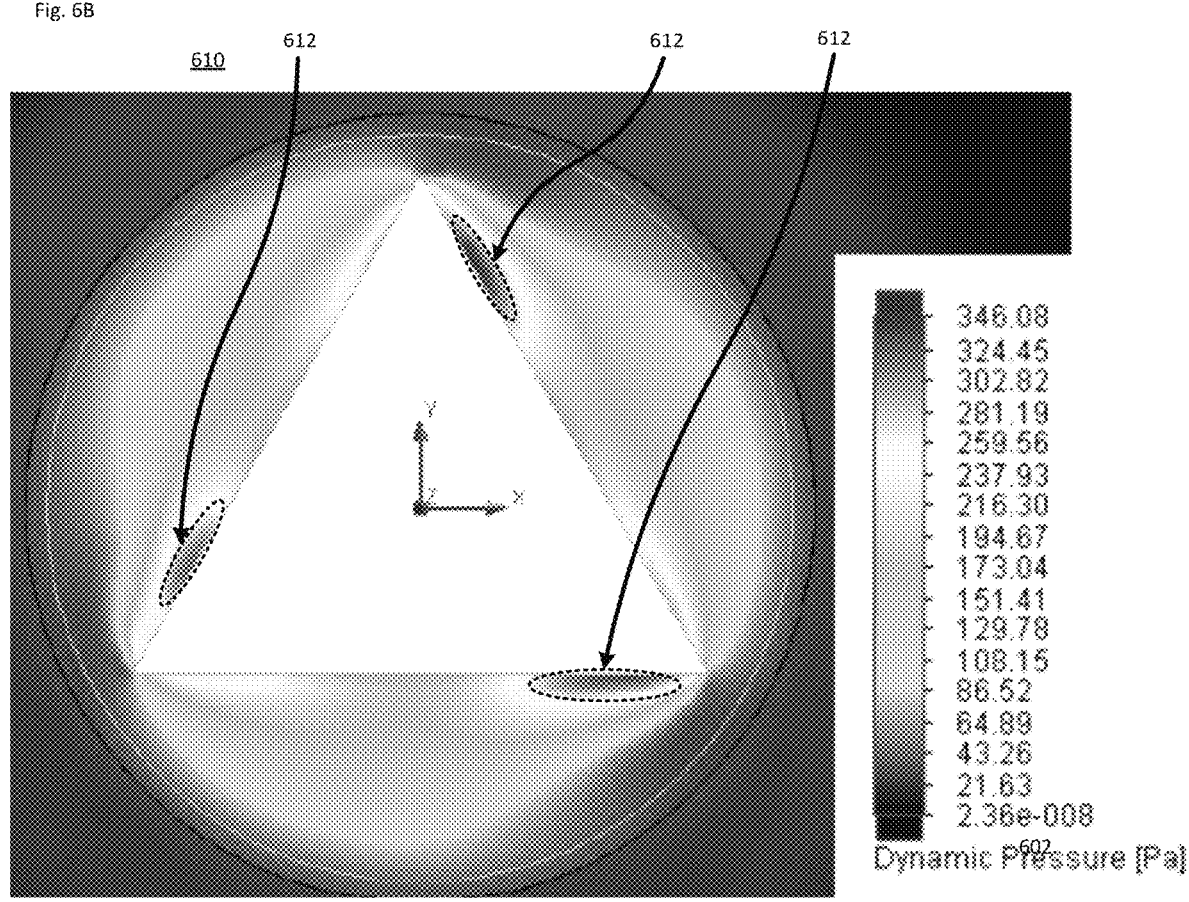

FIG. 6B illustrates a dynamic pressure example 610. Here, again, the mirror assembly is rotating in a counterclockwise direction. As shown, dotted regions 612 along the trailing parts of the mirror surfaces adjacent to the edges experience the highest dynamic pressure. In this example, these parts of the mirror surfaces experience dynamic pressures in on the order of 300 Pa or more.

One result of rotating at high speeds is that it produces an aerodynamic drag, resulting in relatively poor power consumption for the sensor (e.g., Lidar) unit. In particular, the drag may account for about 10-20% of the unit's power consumption. By way of example, the power required to drive the mirror assembly is proportional to the size of the mirror assembly. In particular, it may be proportional to the length of the mirror, but with the fourth power of the diameter of the mirror, and with the third power of the angular velocity. Thus, the larger the mirror surfaces, the exponentially larger the potential drag. Another impact is that the drag and dynamic pressure differences could potentially cause uneven heating or other adverse consequences for the mirror assembly.

Figure 7A:
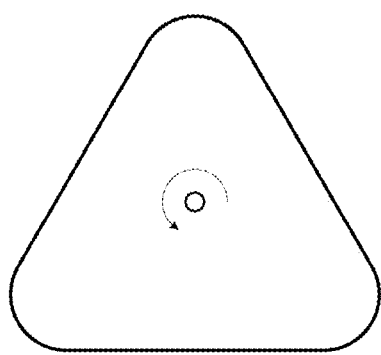
FIGS. 7A-B illustrate a rounded mirror assembly in accordance with aspects of the disclosure.
Figure 7B:
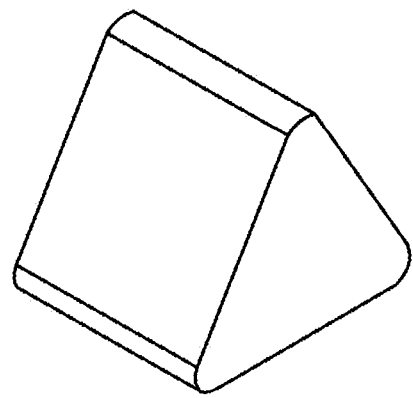

In order to address such issues, aspects of the technology provide rounded, filleted, beveled, chamfered or otherwise truncated corners (edges) to the mirror assembly. Such truncated edges reduce the air velocity and dynamic pressure along the corners of the triangle or other geometric shape. FIGS. 7A-B illustrate an example mirror assembly 700 having rounded corners. By way of example, the radius of curvature for the rounded corners may be on the order of hundreds of microns (e.g., 100-900 microns) or several millimeters or more, depending on the size of the mirror assembly. For instance, each truncated edge may be rounded with a selected radius of curvature of at least 0.1 mm. Alternatively, the radius of curvature may be between 0.1 mm and 1.0 mm Still further, the radius of curvature may be no more than 2.0-5.0 mm.

FIGS. 8A-B illustrate another mirror assembly configuration, in which the corners of the geometric shape are sharply truncated rather than rounded. As shown in FIGS. 7-8, the rounding or other truncation may run the length of the reflective surfaces. However, in other examples, the truncation may extend anywhere from 25% to 95% or more of the length of the reflective surfaces. One example 810 of this is illustrated in FIG. 8C. Here, a first region 812 of the mirror assembly is arranged with truncated corners for use with the transmit side of the optical subsystem. A second region 814 of the mirror assembly is arranged without truncated corners for use with the receive side of the optics subsystem. Also illustrated are spindle elements 816, which may be part of the actuators used to rotate the mirror assembly. In this example, one may place a light baffle (not shown) along the demarcation region 818 between the transmit and receive sides. This can help to optically isolate the two sections of the optics subsystem. For instance, placing the light baffle at the limit of the truncation may make it easier to attach, since the baffle can be attached on the side-wall created by the truncation.

Truncated mirror assemblies such as those described above can reduce the localized wind velocity and dynamic pressure. For instance, FIG. 9A illustrates a velocity example 900, in which the mirror assembly is rotating in a counterclockwise direction. The small arrows indicate example directions of airflow, and the image is shaded to indicate localized wind velocities. As shown, dotted regions 902 experience the highest localized wind velocities; however, such velocities are lower than those illustrated in FIG. 6A. Here, the dotted regions 902 may only experience velocities on the order of 16-20 m/s, along the trailing parts of the mirror surfaces adjacent to the edges. Similarly, as shown in the dynamic pressure example 910 of FIG. 9B, the localized pressure may be lower than with sharp-edged corners. Here, again, the mirror assembly is rotating in a counterclockwise direction. As shown, dotted regions 912 along the trailing parts of the mirror surfaces adjacent to the edges experience the highest dynamic pressure. In this example, these parts of the mirror surfaces experience dynamic pressures on the order of 250-300 Pa.

Rounding or otherwise truncating the mirror corners can reduce the overall surface area of the mirror faces. FIGS. 10A-C illustrate a few examples. In particular, FIG. 10A illustrates a non-truncated mirror assembly. Here, the inner circle illustrates a rotational diameter of, for example, 16 cm. In this case, the side of each mirror face would have a length on the order of 13.86 cm. FIG. 10B illustrates one example of rounded corners, in which the rounding reduces the length of the mirror face. By way of example, the radius of curvature in this example may be on the order of 0.1 mm. Here, as shown, the side length is on the order of 10.40 cm. In contrast, FIG. 10C illustrates another example of rounded corners, in which the rounded parts are extended to the edge of the rotational diameter, thereby maximizing the size of the mirror surface. By way of example, the radius of curvature in this example may be on the order of 1.0 mm Here, the side length is on the order of 12.12 cm. A larger mirror surface results in a larger mirror assembly, which in turn can increase torque due to aerodynamic drag.

Figure 11D:
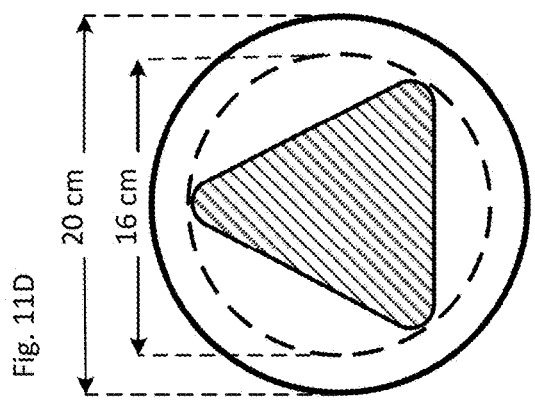
FIGS. 11A-F illustrate examples of mirror assemblies with baffles in accordance with aspects of the disclosure.
Figure 11F:
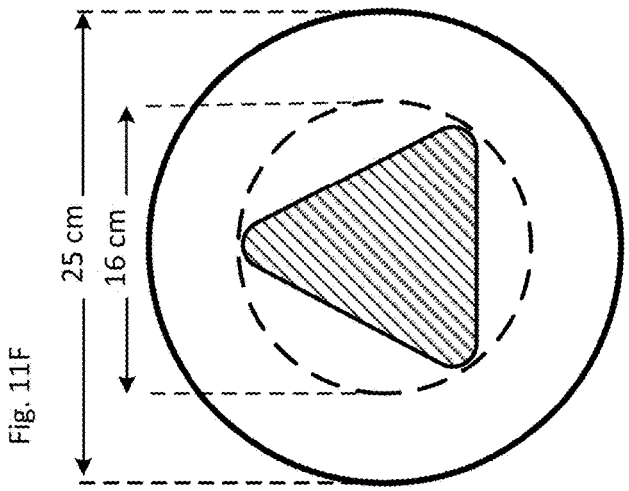
Figure 11C:
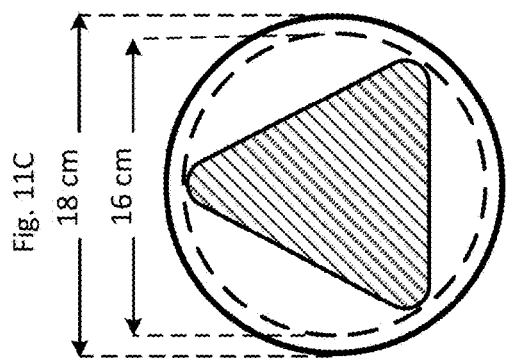
Figure 11E:
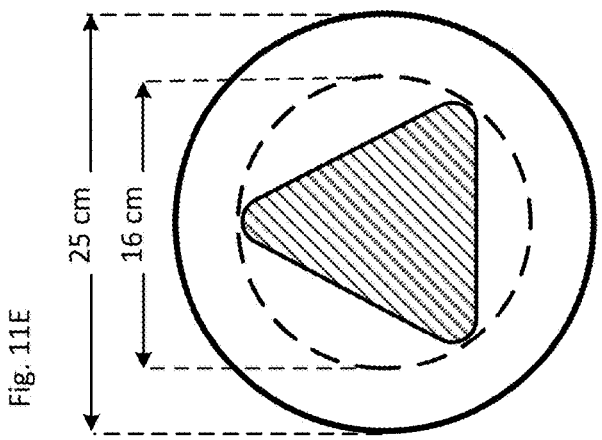
Figure 11B:
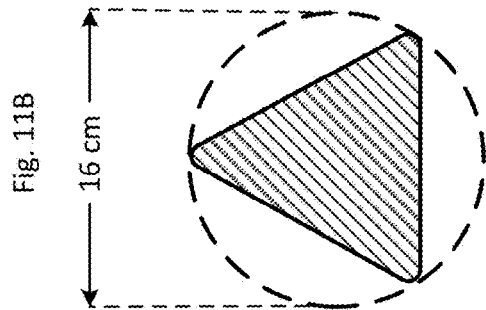
Figure 11A:
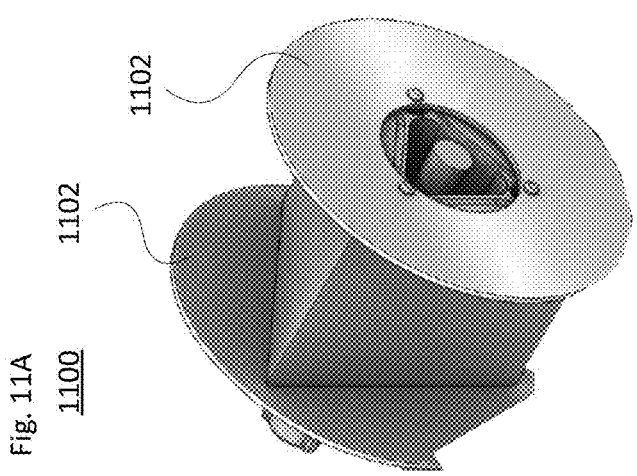

As noted with regard to FIG. 5, the housing or other support structure for the sensor unit may include one or more beam stops, light baffles and/or acoustic/aerodynamic baffles. FIG. 11A illustrates one example 1100 with a pair of acoustic/aerodynamic baffles 1102. The baffles 1102 are arranged as two discs, whose primary purpose is to reduce acoustic noise and decrease the aerodynamic drag (and therefore torque) acting on the mirror assembly. FIGS. 11B-F illustrate different examples in which the mirror assembly size remains constant, but the area of each baffle increases. For instance, in FIG. 11B, the rotational diameter of the mirror assembly is, e.g., 16 cm, and the diameter of the baffles is 16 cm. In FIG. 11C, the baffle diameter is, e.g., 18 cm, and in FIG. 1D it is, e.g., 20 cm. In FIG. 11E the baffle diameter is, e.g., 25 cm, while in FIG. 11F the baffle diameter is, e.g., 30 cm. The increase in baffle diameter may increase torque during rotation of the mirror assembly. Thus, a tradeoff may exist between the amount of acoustical baffling desired versus the power required to address any increase in drag.

The approaches described herein have a number of benefits and advantages. For instance, rounded or otherwise truncated corners reduce wind drag on the mirror assembly. This can also reduce the need to split the transmitted beam on the corner of the mirror at the top of the field of view. Also, the sidewalls where the mirror assembly has been truncated can be a good place to attach a baffle that separates the transmit and receive sides of the optics subsystem.

As noted above, sensor assemblies such as those described above may be employed on a vehicle, either one that is capable of operating in a self-driving mode or one with a human driver. Such sensor assemblies may also be used with non-vehicle equipment, and can be deployed at or near a building or other structure in order to detect people and other objects in the environment.

The foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. And the same reference numbers in different drawings can identify the same or similar elements.

The invention claimed is:

1. A rotary sensor device, comprising:
a mirror assembly having a plurality of reflective surfaces arranged in a geometric shape, the geometric shape having an axis, the mirror assembly being configured to rotate in a clockwise or counterclockwise direction about the axis; and
a control system operatively coupled to the mirror assembly and a laser light source, the control system being configured to set a rate of rotation of the mirror assembly about the axis, and to control emission of light from the laser light source so that emitted light is reflected off of one or more of the plurality of reflective surfaces and is directed to one or more locations in an environment external to the rotary sensor device;

wherein the plurality of reflective surfaces of the mirror assembly are coupled to one another along a set of edges.

2. The rotary sensor device of claim 1, wherein the plurality of reflective surfaces is three reflective surfaces, and the geometric shape is triangular.

3. The rotary sensor device of claim 2, wherein the geometric shape is an equilateral triangle.

4. The rotary sensor device of claim 1, further including:
a spindle extending along the axis; and
one or more actuators coupled to the spindle;
wherein the control system is configured to activate the one or more actuators to cause the spindle to rotate the mirror assembly about the axis.

5. The rotary sensor device of claim 1, further comprising at least one light baffle affixed to an end of the mirror assembly, the at least one light baffle providing optical isolation between transmit and receive areas of the rotary sensor device.

6. The rotary sensor device of claim 5, wherein the at least one baffle extends at least 10% past the edges of the mirror assembly.

7. The rotary sensor device of claim 5, wherein the at least one light baffle comprises a pair of light baffles, a first one of the light baffles being arranged along a first end of the mirror assembly and a second one of the light baffles being arranged along a second end of the mirror assembly.

8. The rotary sensor device of claim 1, further comprising at least one acoustic baffle affixed to an end of the mirror assembly.

9. The rotary sensor device of claim 8, wherein the at least one acoustic baffle comprises a pair of acoustic baffles, a first one of the acoustic baffles being arranged along a first end of the mirror assembly and a second one of the acoustic baffles being arranged along a second end of the mirror assembly.

10. The rotary sensor device of claim 1, further comprising at least one aerodynamic baffle affixed to an end of the mirror assembly, the at least one aerodynamic baffle being configured to reduce aerodynamic drag as the mirror assembly rotates.

11. The rotary sensor device of claim 10, wherein the at least one aerodynamic baffle comprises a pair of aerodynamic baffles, a first one of the aerodynamic baffles being arranged along a first end of the mirror assembly and a second one of the aerodynamic baffles being arranged along a second end of the mirror assembly.

12. The rotary sensor device of claim 1, wherein one or more edges of the set of edges are truncated.

13. The rotary sensor device of claim 12, wherein the truncation is one of rounding, beveling or chamfering.

14. A rotary sensor apparatus, comprising:
a mirror assembly having a plurality of reflective surfaces arranged in a geometric shape, the geometric shape having an axis, the mirror assembly being configured to rotate in a clockwise or counterclockwise direction about the axis;
a laser light source configured to emit light so that the emitted light is reflected off of one or more of the plurality of reflective surfaces and is directed to one or more locations in an environment external to the rotary sensor apparatus; and
a control system operatively coupled to the mirror assembly and the laser light source, the control system being configured to set a rate of rotation of the mirror assembly about the axis, and to control emission of light from the laser light source so that emitted light is reflected off of one or more of the plurality of reflective surfaces and is directed to one or more locations in an environment external to the rotary sensor apparatus;
wherein the plurality of reflective surfaces of the mirror assembly are coupled to one another along a set of edges.

15. The rotary sensor apparatus of claim 14, further including:
a spindle extending along the axis; and
one or more actuators coupled to the spindle;
wherein the control system is configured to activate the one or more actuators to cause the spindle to rotate the mirror assembly about the axis.

16. The rotary sensor apparatus of claim 15, further comprising at least one light baffle affixed to an end of the mirror assembly, the at least one light baffle providing optical isolation between transmit and receive areas of the rotary sensor apparatus.

17. The rotary sensor apparatus of claim 15, further comprising at least one acoustic baffle affixed to an end of the mirror assembly.

18. The rotary sensor apparatus of claim 15, further comprising at least one aerodynamic baffle affixed to an end of the mirror assembly, the at least one aerodynamic baffle being configured to reduce aerodynamic drag as the mirror assembly rotates.

19. The rotary sensor apparatus of claim 15, wherein one or more edges of the set of edges is truncated.

20. The rotary sensor apparatus of claim 19, wherein the truncation is one of rounding, beveling or chamfering.

21. A vehicle comprising:
a driving system configured to perform acceleration, deceleration and steering operations; and
a perception system operatively coupled to the driving system, the perception system comprising one or more rotary sensor apparatuses according to claim 14.

* * * * *